Nov. 13, 1951 — J. R. SMYTH — 2,575,076
METHOD OF MANUFACTURING BATTERIES
Filed June 11, 1947

INVENTOR.
JOHN R. SMYTH
BY
Kwis Hudson Boughton & Williams
ATTORNEYS

Patented Nov. 13, 1951

2,575,076

UNITED STATES PATENT OFFICE 2,575,076

METHOD OF MANUFACTURING BATTERIES

John R. Smyth, East Cleveland, Ohio, assignor to Willard Storage Battery Company, Cleveland, Ohio, a corporation of West Virginia Application June 11, 1947, Serial No. 753,996

1 Claim. (Cl. 154—129)

The present invention relates to methods of securing metal to plastics and, more particularly, to a method of securing a bottom lead terminal to a plastic battery container. This application is a continuation-in-part of my co-pending application Serial No. 486,819, filed May 13, 1943, and now abandoned.

Heretofore considerable difficulty has been experienced in effectively securing metals and, more particularly, lead to plastics and no satisfactory method has been provided for securing a lead terminal to a battery container formed of a plastic. While in its broader aspects the present invention relates to a method of securing metal and resinous members together, the principal object of the invention is the provision of a novel and improved method by which a lead terminal and, more particularly, a bottom lead terminal may be effectively secured to a plastic battery container.

The invention may be briefly summarized as consisting in certain novel steps hereinafter described and specifically pointed out in the appended claim and further objects and advantages of the invention will be apparent from the following disclosure.

In the accompanying sheet of drawings.

Figure 2:
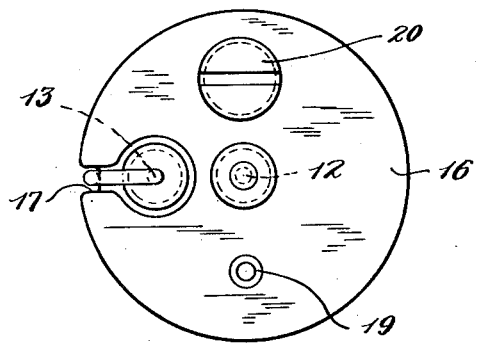
Fig. 2 is a top plan view of the same.
Figure 1:
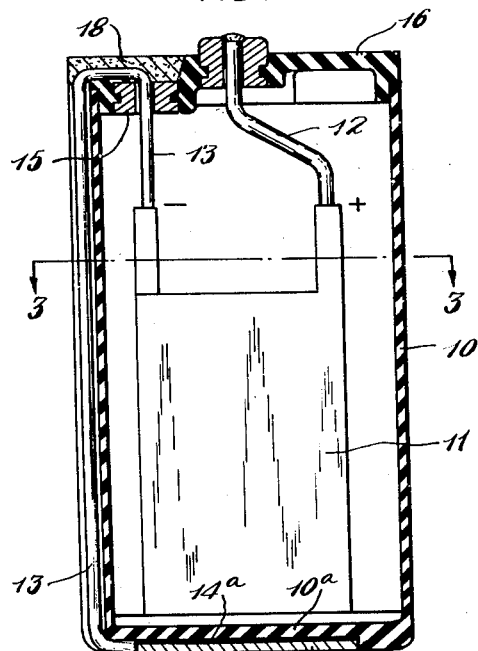
Fig. 1 is a vertical sectional view of a battery constructed in accordance with the present invention.
Figure 3:
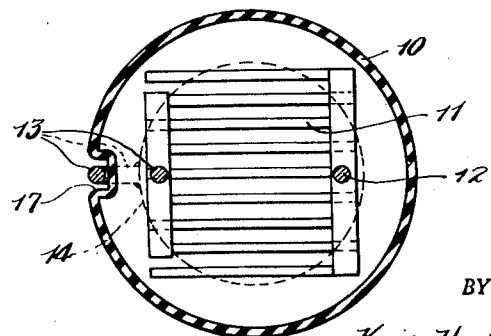
Fig. 3 is a transverse sectional view thereof.

The present invention is applicable to dry cells as well as to storage batteries, although I have shown a storage battery only. The battery shown is of the lead-acid type and comprises a container 10 and the usual battery element including a plurality of positive and negative plates 11. The container 10 is cylindrical in shape and formed from a suitable plastic, such as polystyrene. One terminal of the battery, which terminal is in the form of a connector or post 12, extends centrally to the top of the battery and is held there by a lead insert and is leadburned or soldered to the insert at the top. The connector or post 13 forming the other terminal of the battery extends outwardly and downwardly to a lead terminal 14 which is secured to the bottom of the container in accordance with the present invention. This lead terminal 14 is in the form of a disk seated in a similarly shaped recess 10a formed in the bottom of the container 10. The connector 13 is suitably secured to the disk 14 as by lead-burning.

As shown, the connector or post 13 extends upwardly from the battery strap through a lead insert 15 provided in a depressed part of the cover 16 and then laterally and then downwardly through a vertical external groove 17 formed in the case or container 10. The recess where the connector extends laterally in the cover is preferably filled with suitable sealing compound 18. The cover 16 is provided with a vent tube 19 and a removable filler plug 20. Preferably the plates 11 are separated by electrolyte absorbent insulating material, such as glass wool, and they are held from movement in the container by additional electrolyte absorbent material, such as "Fibrite" which is an insulating material made from tree bark fibers.

As before stated, a great deal of difficulty has been encountered in securely fastening the bottom lead terminal to the bottom of the battery case which is usually formed of a plastic. I find that an exceedingly good bond can be obtained in the following manner:

The face or surface 14a of the disk 14 which is to be cemented to the plastic container is coated, preferably sprayed with a thin coating of cement which, when the container is formed of polystyrene, preferably comprises a polyvinyl resin, such as polyvinyl chloride dissolved in a hydrocarbon or other suitable solvent, such as toluol, or benzol, to which has been added a suitable plasticizer, such as one of the phthalates. Alternatively the cement may consist of polystyrene with a suitable solvent and plasticizer. The side of the disk to which the cement or coating is applied is preferably sand-blasted prior to the application of the coating thereto. After the thin coating is applied to the disk, the coated disk is baked for a few minutes at a temperature of between 350° and 450° F. to not only drive out the solvent but also all or most of the plasticizer and to form a dry hard surface comparable to a thoroughly dried coat of paint. Neither the baking temperature nor the period is critical so long as the coated disk is exposed to a high enough temperature for a sufficient length of time to vaporize the solvent and adhere particles of the coating material to the metal. The optimum temperature and period will vary under different conditions and with different plastics.

The temperature employed is usually determined by the plasticizer which, in most instances, will have a vapor point higher than the solvent. The temperature at which the disk or terminal is heated and the period of heating should be sufficient to vaporize the solvent and all or most of the plasticizer and to form a thoroughly dried, hard coating without charring or destroying the chemical structure of the resin base. The period of heating and the temperature thereof are also a function of the type of metal and the shape and size of the terminal; for example, in the case of a lead terminal of the shape shown, it is preferably heated for about twelve minutes at 400° F. When the present invention is employed with a cup-shaped lead terminal similar to that shown in my issued Patent No. 2,416,652, the terminal is preferably heated for from eighteen to twenty minutes at 400° F. A slight amount of burning or charring of the resin base is acceptable but ordinarily the terminal should be removed from the heating oven when the resin film loses its gloss or becomes slightly discolored or when it begins to give off an odor. The result is a thin, hard coating on the lead terminal which adheres thereto extremely well. By the baking process a much better adherence is obtained between the disk and the cement than would be obtained by air drying.

After the disk has been baked and cooled, an additional coating or coatings of cement may be applied to the coated side of the disk, which coating or coatings are preferably air dried. The additional coating or coatings adhere strongly to the original coating probably because some of the plasticizer in the second coating penetrates the initial or baked coating, thus forming a strong bond between the coatings. If the last coating of cement applied to the disk is allowed to dry, a solvent common thereto and to the case is applied to one or the other or both parts and the parts firmly pressed together and air dried to remove the solvent. When the cement has dried, a very strong bond is obtained between the bottom of the container and the lead disk 14. The terminal is preferably applied or pressed to the container at normal or room temperatures but in any event at a temperature below that which would tend to soften the material of the container with the possibility of distorting its shape.

Polystyrene is the preferred material for the container, but other resins, either thermoplastic or thermosetting, may be used, such as vinyl chloride and other acid-resisting resins. When a polystyrene container is employed, a polyvinyl resin is preferably dissolved in a solvent to form the cement with which the lead terminal is coated; however, other types of cement or adhesives may be used with a polystyrene container. I have successfully used a cement consisting of a vinyl chloride resin dissolved in a suitable solvent and a plasticizer. I have also used a cement or adhesive having a "Thiokol" (ethylene polysulfide) base. The principal requirement is that the solvent used in forming the adhesive be such as to dissolve or attack the container material and in so doing produce a strong bond.

While I have described the preferred method in considerable detail and as employed with one type of terminal, I do not desire to be limited to the precise steps described or to the particular form of terminal shown. For example, the bottom terminal 22 of the battery shown in my issued Patent No. 2,416,652 may be secured to the case 10 by the present method, and I intend to cover hereby all modifications and uses which come within the practice of those skilled in the art to which the invention relates.

Having thus described my invention, I claim:

The method of uniting a lead terminal member to a polystyrene battery case which comprises coating a surface of the lead member with cement comprising a polyvinyl resin dissolved in a suitable solvent and including a phthalate plasticizer, heating the coated lead member to a temperature and for a period until the solvent and at least part of the plasticizer has been driven off and the coating is hard and dry and loses its gloss, applying a subsequent coating over said dried coating, said subsequent coating comprising polyvinyl resin dissolved in a suitable solvent and including a phthalate plasticizer, air drying said subsequent coating, applying a solvent common to said polystyrene member and said coatings to a surface of said polystyrene member and the coated surface of said lead member and pressing said surfaces together while the last mentioned solvent is wet, and drying said last mentioned solvent.

JOHN R. SMYTH.

REFERENCES CITED

The following references are of record in the file of this patent:

UNITED STATES PATENTS

| Number | Name | Date |
|---|---|---|
| 1,895,419 | Mitchell et al. | Jan. 24, 1933 |
| 2,060,035 | Cheney et al. | Nov. 10, 1936 |
| 2,228,332 | Wick et al. | Jan. 24, 1941 |
| 2,418,233 | McClary | Apr. 1, 1947 |
| 2,423,869 | Blessing | July 15, 1947 |

FOREIGN PATENTS

| Number | Country | Date |
|---|---|---|
| 115,946 | Australia | Oct. 8, 1942 |

OTHER REFERENCES

Cordo-Bonds, page 6, publication of Cordo Chemical Corp., Norwalk, Conn., July 1944. Catalog #1.